June 6, 1939.   C. E. SWARTZ   2,161,597

METHOD OF BONDING POWDERED METALLIC MATERIAL

Filed July 22, 1936

INVENTOR.
Carl E. Swartz
BY Fay, Oberlin & Fay
ATTORNEYS.

Patented June 6, 1939

2,161,597

UNITED STATES PATENT OFFICE 2,161,597

METHOD OF BONDING POWDERED METALLIC MATERIAL

Carl E. Swartz, Cleveland Heights, Ohio, assignor to The Cleveland Graphite Bronze Company, Cleveland, Ohio, a corporation of Ohio Application July 22, 1936, Serial No. 91,870

1 Claim. (Cl. 75—22)

The present invention relates to a novel method for bonding a powdered metallic material or mixture to a solid supporting body such as steel. The general object and nature of the invention is to provide such a bonding process which will produce an efficient and satisfactory union of the powdered material, in sintered form, to the solid material or steel.

A further object of the invention is to eliminate the formation of various oxides, metallic alloys, and other chemical compounds which heretofore have weakened and contaminated the bond or juncture between the sintered metallic material and the solid body so that a practical and commercially adaptable product was not obtainable. Briefly outlined, the method embodying the principle of my invention comprises the initial step of properly cleaning, both mechanically and chemically, the surface of the supporting steel body, and then maintaining such cleaned surface in uncontaminated and protected condition while the powdered metallic material, placed in contact therewith, is heated to a sintering temperature. The term "cleaning" as here used means the removal of all particles and films of foreign material from the surface of the steel and the maintaining of the cleaned surface in such a condition during the cleaning operation and immediately thereafter that it will not again immediately collect such foreign particles or films by oxidation.

To the accomplishment of the foregoing and related ends, said invention, then, consists of the steps hereinafter fully described and particularly pointed out in the claim; the annexed drawing and the following description setting forth in detail one approved method of carrying out the invention, such disclosed method however, constituting but one of the various ways in which the principle of the invention may be used.

In said annexed drawing:—

Figure 1:
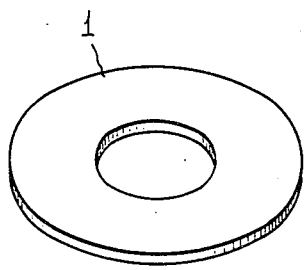
Figure 2:
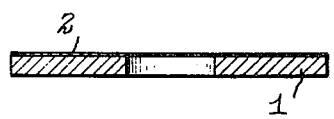
Figure 3:
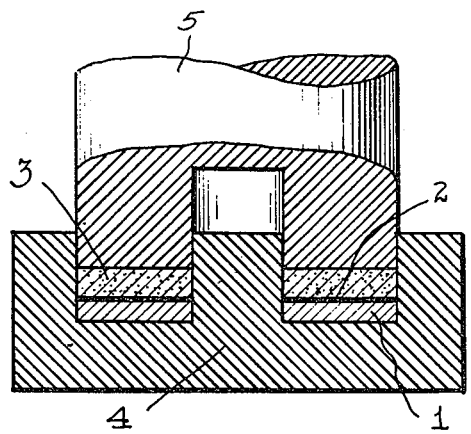
Figure 4:
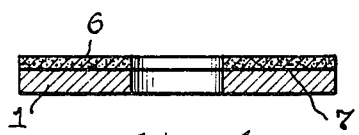

Fig. 1 is a perspective view of a ring of the solid supporting metal body such as steel; Fig. 2 is a sectional view of the ring of Fig. 1, showing a layer of the protective material applied to the surface of the ring; Fig. 3 is a cross-sectional view of an apparatus illustrating the performance of the sintering and bonding step of my process; and Fig. 4 is a sectional view of the finished product.

The herein described and claimed method is particularly adaptable for the manufacture of composite metallic elements intended for use wherein the elements are subjected to rubbing or frictional surface contact. Articles of manufacture fabricated from the composite metallic elements produced by my process may take the form of brake linings, clutch facings, bearings, and the like. The particular article here described by way of exemplary illustration in the practice of my method is a clutch facing element in the form of a flat ring and consisting of the reinforcing supporting body 1 of solid metal such as steel with the layer 6 of sintered metallic powdered material bonded thereto.

In the practice of my process, the first step consists of mechanically and chemically cleaning the surface of the steel supporting body 1. Such cleaning is effected by any of the customary methods such as grinding, abrading, polishing, machining, sand blasting, pickling, or a combination thereof. After such cleaning of the surface of the steel ring 1 has been accomplished, the surface is covered with a protective coating capable of remaining stable at all elevated temperatures. By the term "elevated temperature" is meant that temperature at which the bonding is begun between the powdered composition and the steel and is also the temperature at which all of the oxygen entrapped in the powdered material or carried on the surface of the steel or coming from any compound which would give off oxygen has been dissipated or combined so that it will not be able to prevent bonding of the material to the steel. The term "protective" is used herein to refer to a coating which will remain protective up to the temperature referred to as an elevated or critical temperature, which is the temperature at which the bonding between the steel and the compound begins, that is, the temperature at which all of the oxygen, which might otherwise prevent bonding, has been dissipated or combined. Particularly suitable for the purpose of supplying such protective coating is a "flash coat" of copper plating. In order to produce such a flash coating of copper on the surface of the steel ring 1, the latter is placed in an electrolitic deposition bath and allowed to remain at least until there is produced a copper color on the steel surface.

The protective coating 2 applied to the steel ring 1 may also consist of a non-reactive material, such as a high flash point oil, which will remain protective and will not become completely decomposed or gaseous until subjected to a temperature above that herein referred to as an elevated or critical temperature.

The steel ring 1 with its protective coating 2 is next placed in a forming die, consisting of the female die member 4 and the male die member 5 or plunger 5, with the layer of powdered metallic material 3 superimposed on the steel ring 1. The assembled elements in the apparatus shown in Fig. 3, consisting of the steel ring 1, the protective coating 2 and the layer of powdered metallic material 3 are then subjected to pressure and a temperature sufficient to sinter the powdered material 3 and to thereby bond the layer to the steel ring 1. One method of compressing and sintering the powdered material and the steel supporting layer is more particularly described and claimed in my co-pending application "Method of making composite metallic elements", filed July 22, 1936, Serial No. 91,869.

The resultant product of the above described process is shown in Fig. 4, and consists of the layer of sintered, powdered metallic material 6 strongly bonded to the steel layer 1 along the bonding line 7. The metallic powdered material 3 may consist of a mixture of a base metal such as aluminum and copper with smaller proportions of other materials such as tin and lead and also containing inert material such as powdered silica, magnesia, talc, graphite or silicon carbide. The use of a protective coating 2, consisting of a flash coat of copper, is particularly desirable in the performance of my process where a copper base metallic powder is used, and almost mandatory in case a high carbon steel is used. The fine particles of the powdered material contain a substantial amount of oxygen and nitrogen in the form of air, some entrained in the mixture and some contained by surface adhesion on the particles, which if allowed to come in contact with the cleaned surface of the steel layer 1 during the heating step, will prevent the formation of an efficient and satisfactory bond due to chemical reaction of the faces to be bonded with these gases. Furthermore, the protective coating of copper plating 2 prevents any of the constituents of the powdered material 3, such as tin, from contacting the surface of the steel layer 1 and in turn alloying with the iron in the steel, which alloy would also be of a brittle and non-ductile nature susceptible of fracture upon flexing of the finished composite element. As will be noted from the illustration of Fig. 4, the layer 2 of copper plating disappears after the heating and sintering of the powdered material 3, since it is absorbed by the copper already present in the powdered mixture, leaving the direct bonding line 7 between the steel layer 1 and the sintered layer 6.

The provision of the protective coating 2 in the performance of the above described method, whether it be in the nature of the copper plating, the high flash point oil, or a similar material and capable of remaining stable at an elevated temperature, also prevents the entrapped oxygen in the powdered material 3 from coming in contact with the cleaned steel surface during heating and sintering, so that the bonding line is not contaminated and the efficiency of the bond thereby not disrupted.

Other modes of applying the principle of my invention may be employed instead of the one explained, change being made as regards the process herein disclosed, provided the step or steps stated by the following claim or the equivalent of such stated step or steps be employed.

I therefore particularly point out and distinctly claim as my invention:—

A method of bonding a powdered metallic material to steel, comprising the steps of cleaning the surface of said steel, applying a covering layer of copper of a thickness less than one-ten-thousandth of an inch to such surface and then subjecting such copper covered steel to compression and a temperature sufficient to sinter said powdered metallic material when placed in contact therewith directly to the steel and to cause diffusion of the copper of such coating to permit of direct bonding of the sintered material to the steel.

CARL E. SWARTZ.